(12) United States Patent
McAtarian et al.

(10) Patent No.: US 8,955,703 B2
(45) Date of Patent: Feb. 17, 2015

(54) COLLAPSIBLE CONTAINMENT BERM

(75) Inventors: Patrick F. McAtarian, St. Mary's, KS (US); Mark McAtarian, St. Mary's, KS (US)

(73) Assignee: Andax Industries LLC, St. Mary's, KS (US)

( * ) Notice: Subject to any disclaimer, the term of this patent is extended or adjusted under 35 U.S.C. 154(b) by 453 days.

(21) Appl. No.: 13/013,546

(22) Filed: Jan. 25, 2011

(65) Prior Publication Data

US 2012/0187119 A1 Jul. 26, 2012

(51) Int. Cl.
*B65D 30/10* (2006.01)
*F16N 31/00* (2006.01)

(52) U.S. Cl.
CPC .................................. *F16N 31/002* (2013.01)
USPC ............................ 220/9.2; 220/666; 220/573

(58) Field of Classification Search
USPC ......... 220/6, 9.2, 9.3, 7, 646, 647, 4.16, 4.17, 220/666, 520, 9.1, 4.29, 9.4, 573; 405/102; 4/585
See application file for complete search history.

(56) References Cited

U.S. PATENT DOCUMENTS

| 5,090,588 | A | | 2/1992 | Van Romer et al. |
| 5,316,175 | A | | 5/1994 | Van Romer |
| 5,511,683 | A | | 4/1996 | Daily |
| 5,547,312 | A | | 8/1996 | Schmitz, Jr. |
| 5,762,233 | A | * | 6/1998 | Van Romer .................. 220/573 |
| 5,924,461 | A | | 7/1999 | Shaw et al. |
| RE39,971 | E | * | 1/2008 | Van Romer .................. 220/573 |
| 7,819,270 | B1 | * | 10/2010 | Hughes .......................... 220/8 |
| 2008/0152431 | A1 | * | 6/2008 | Ramp et al. .................... 405/52 |
| 2010/0028081 | A9 | * | 2/2010 | Barrett et al. ................. 405/52 |
| 2010/0294779 | A1 | * | 11/2010 | Barrett et al. ................ 220/573 |

* cited by examiner

*Primary Examiner* — Jeffrey Allen
(74) *Attorney, Agent, or Firm* — Hovey Williams LLP

(57) ABSTRACT

Containment berms (40) for the collection of hazardous materials are provided which include a floor (42) with an upstanding, continuous, foldable sidewall (44) to define and internal zone (46) for receiving and holding hazardous materials. The sidewall (44) may be supported by means of external support structure (48) and/or internal support structure (50). The support structures (48, 50) each include a plurality of support leg assemblies (52, 52*a*) which are secured to sidewall (44) and are pivotal about respective upright axes (66, 66*a*, 150) and are pivotal from retracted positions close to the sidewall (44) to deployed positions extending from the sidewall (44) and substantially perpendicular thereto.

16 Claims, 12 Drawing Sheets

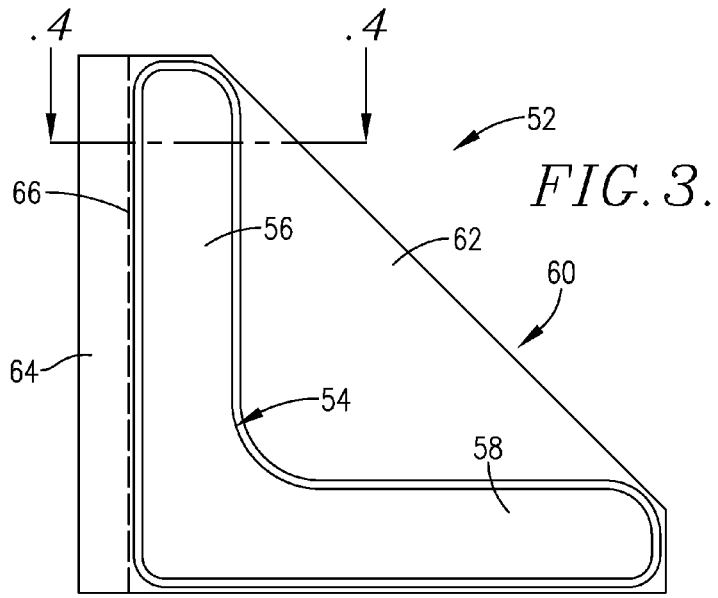
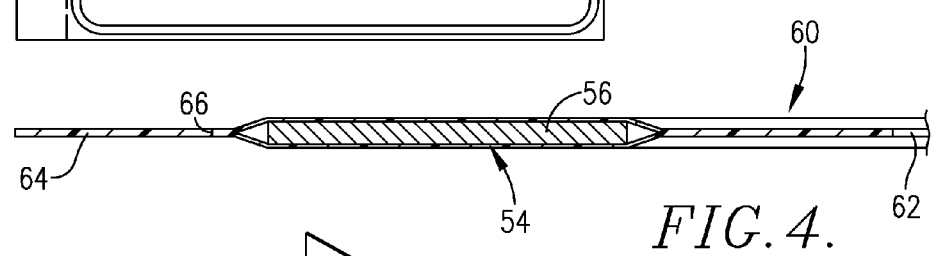
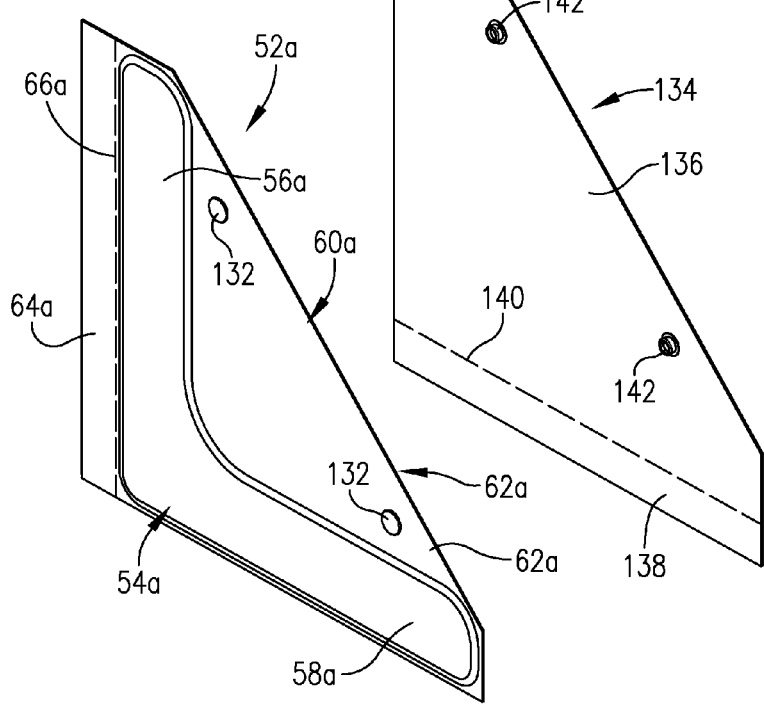
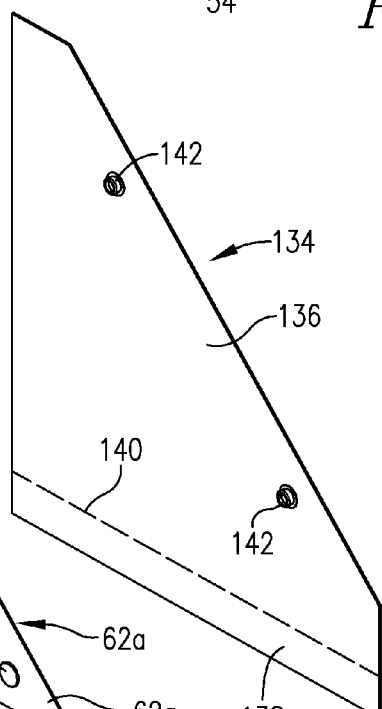

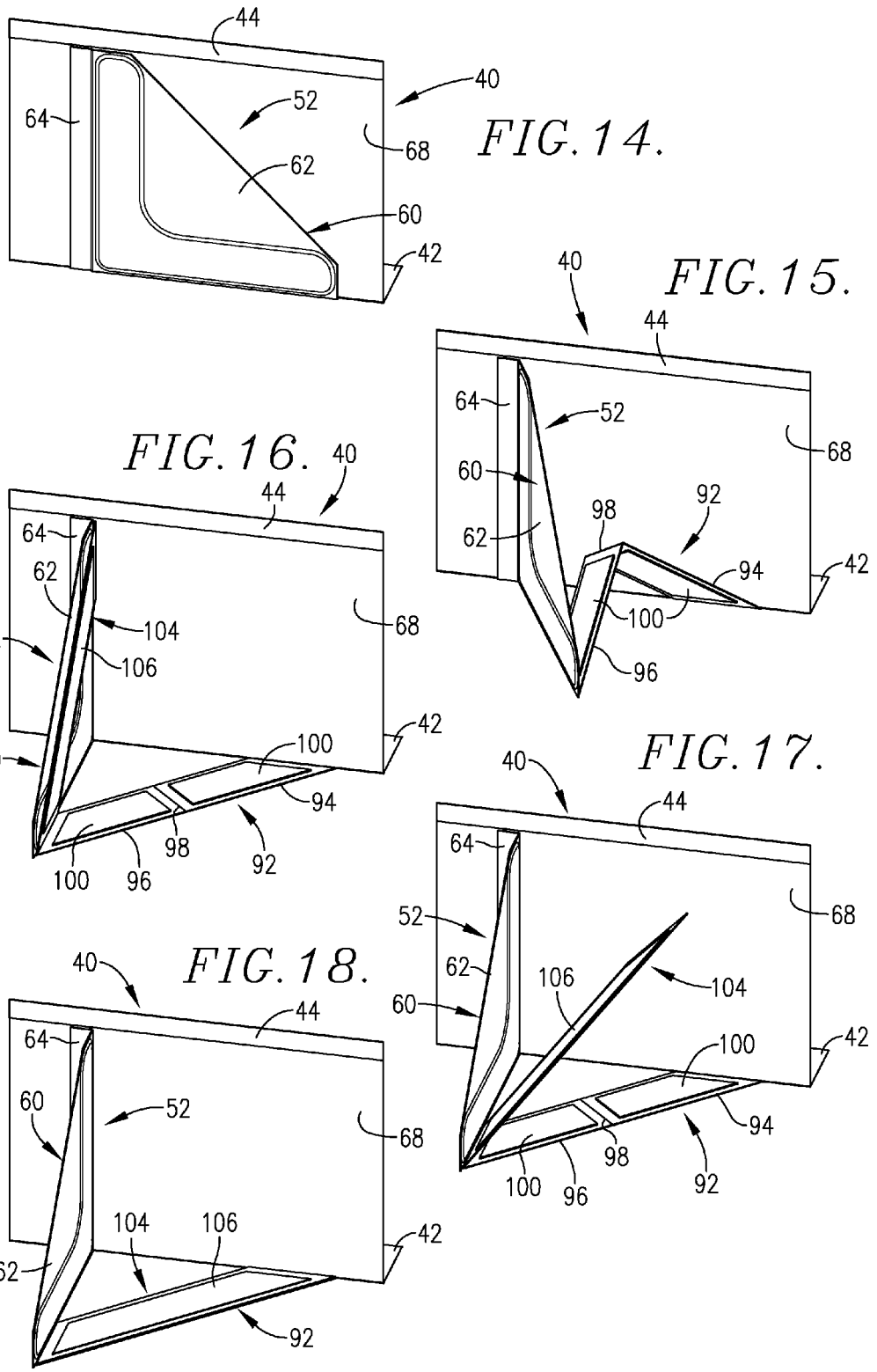

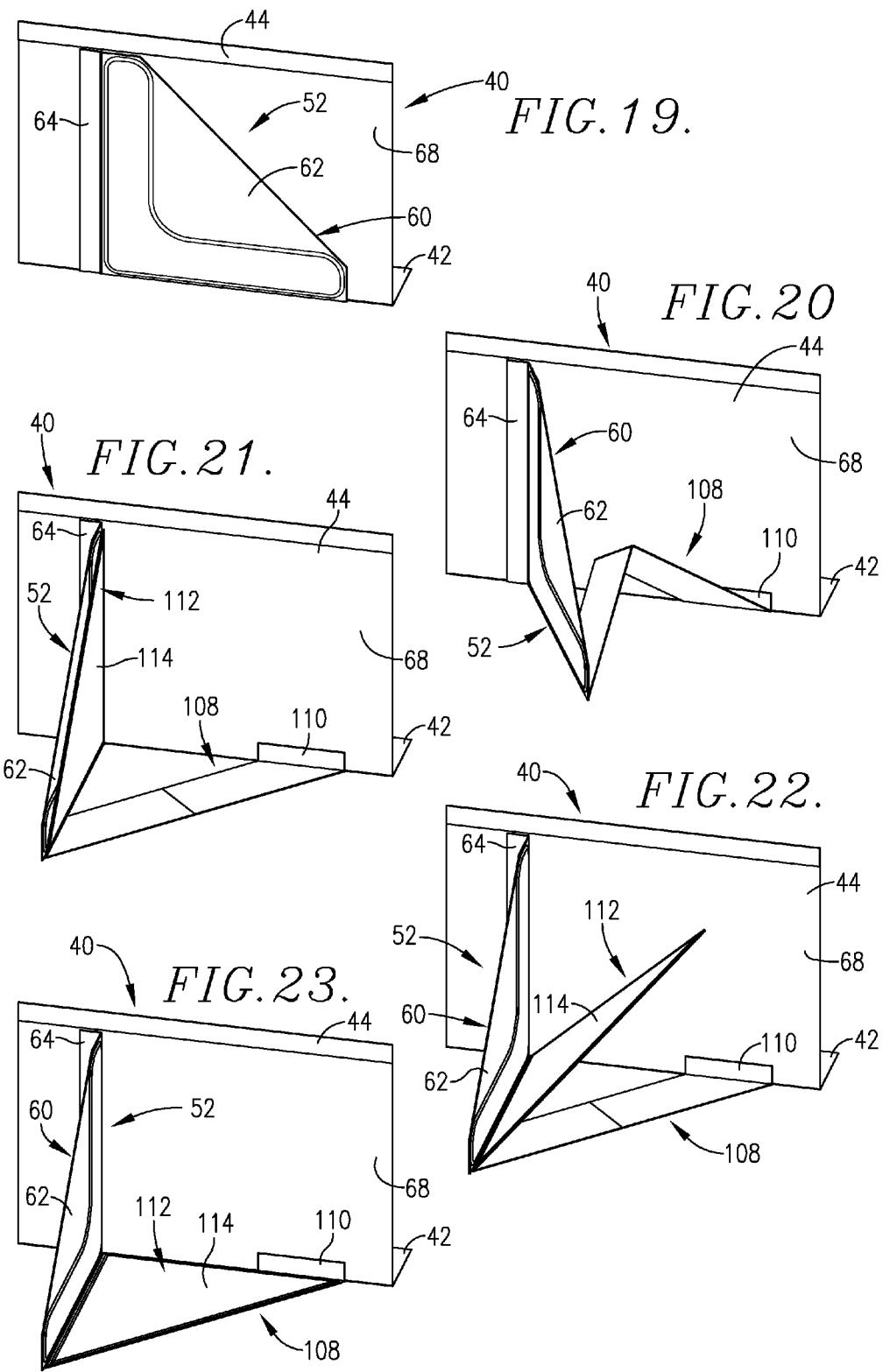

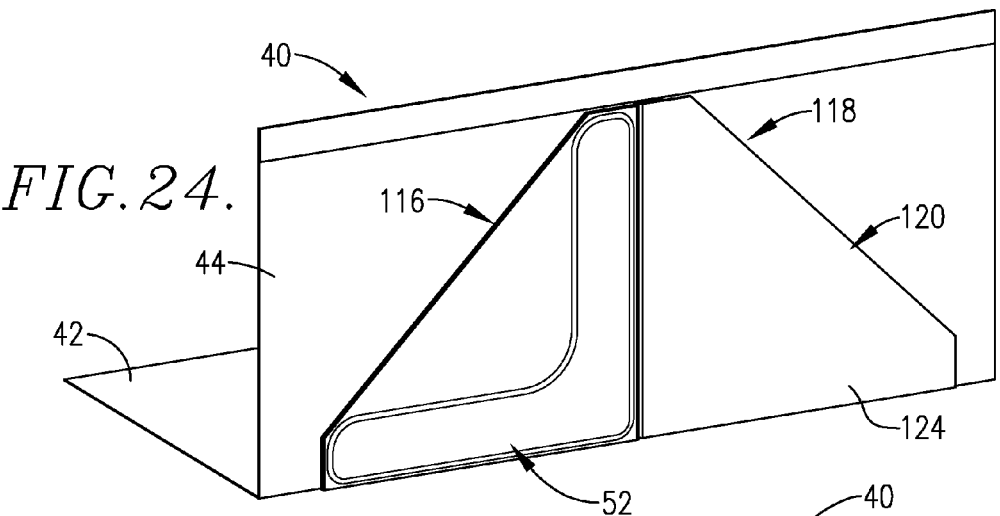
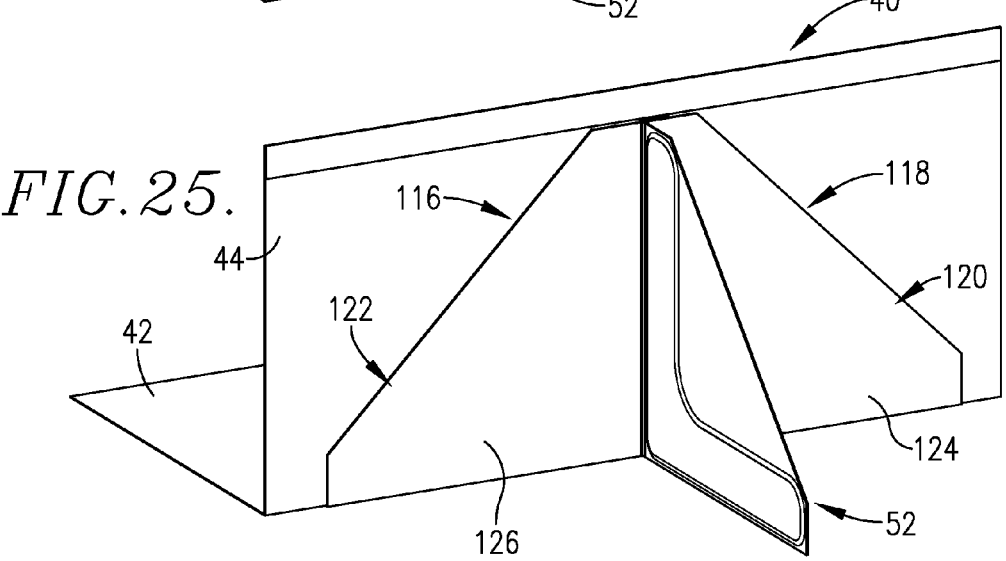
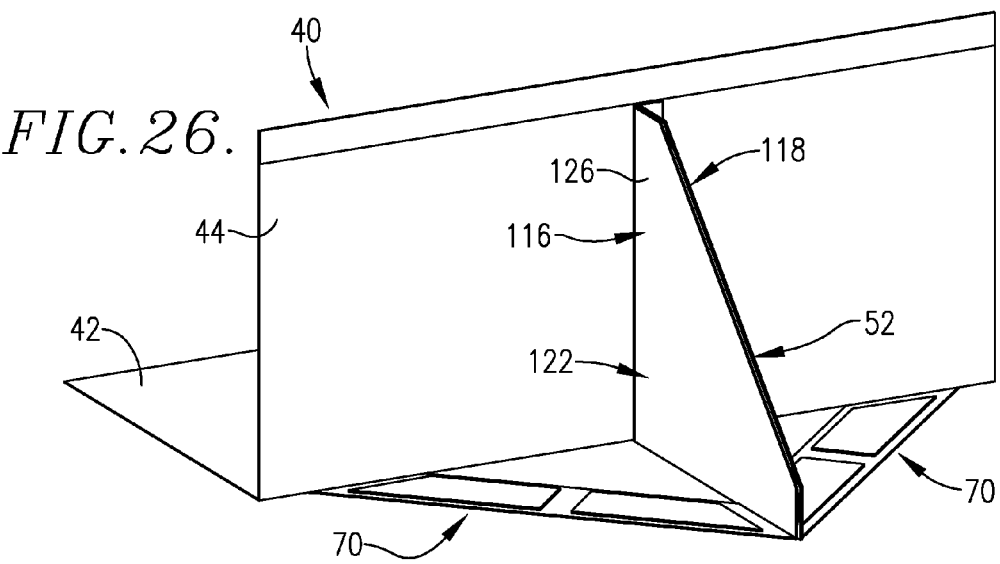

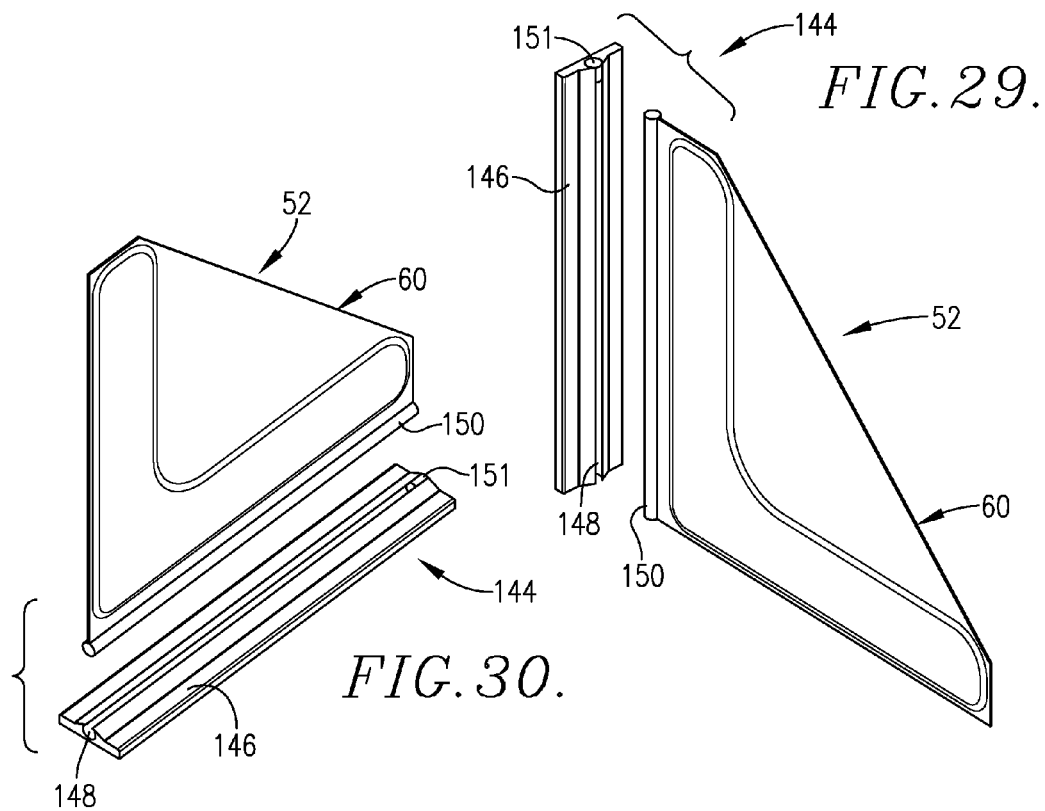
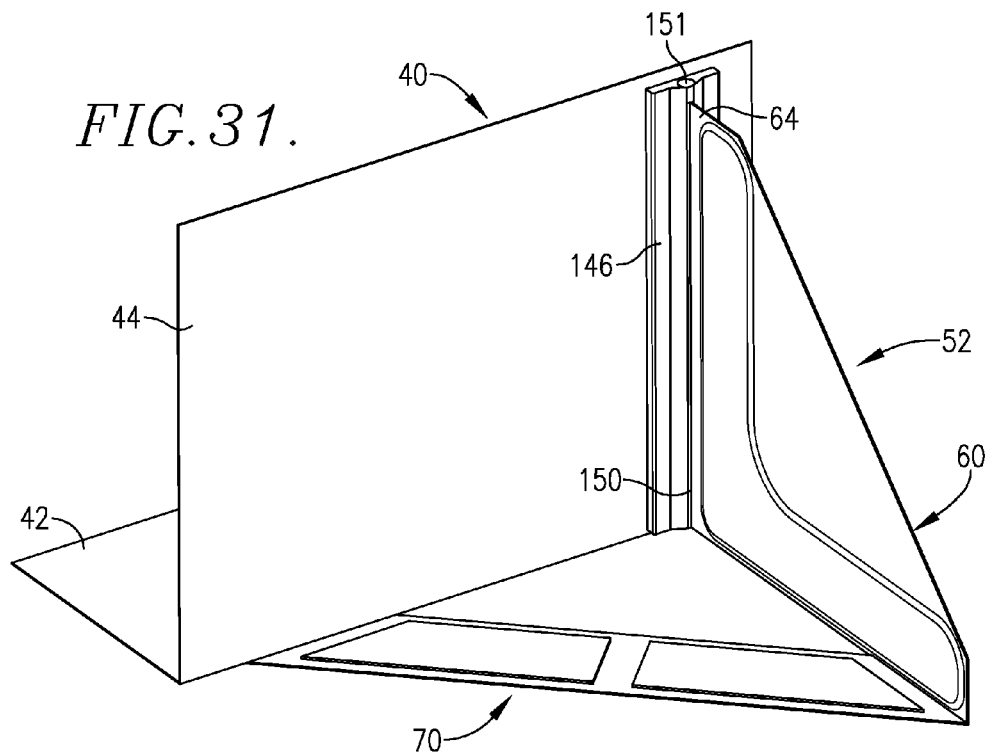

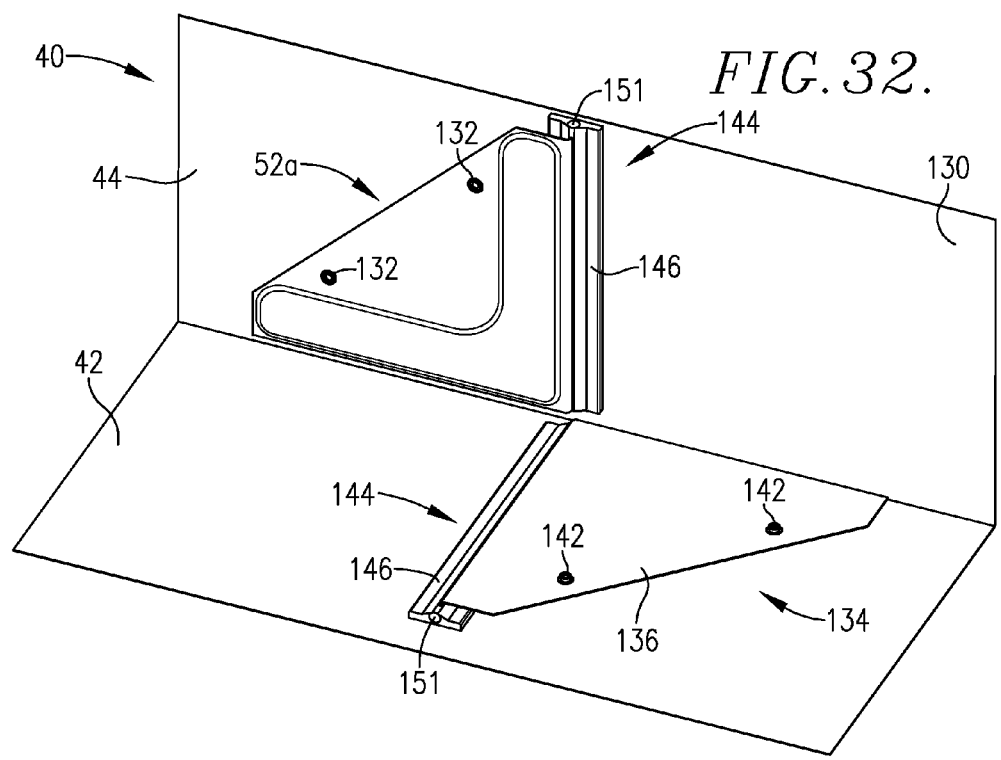
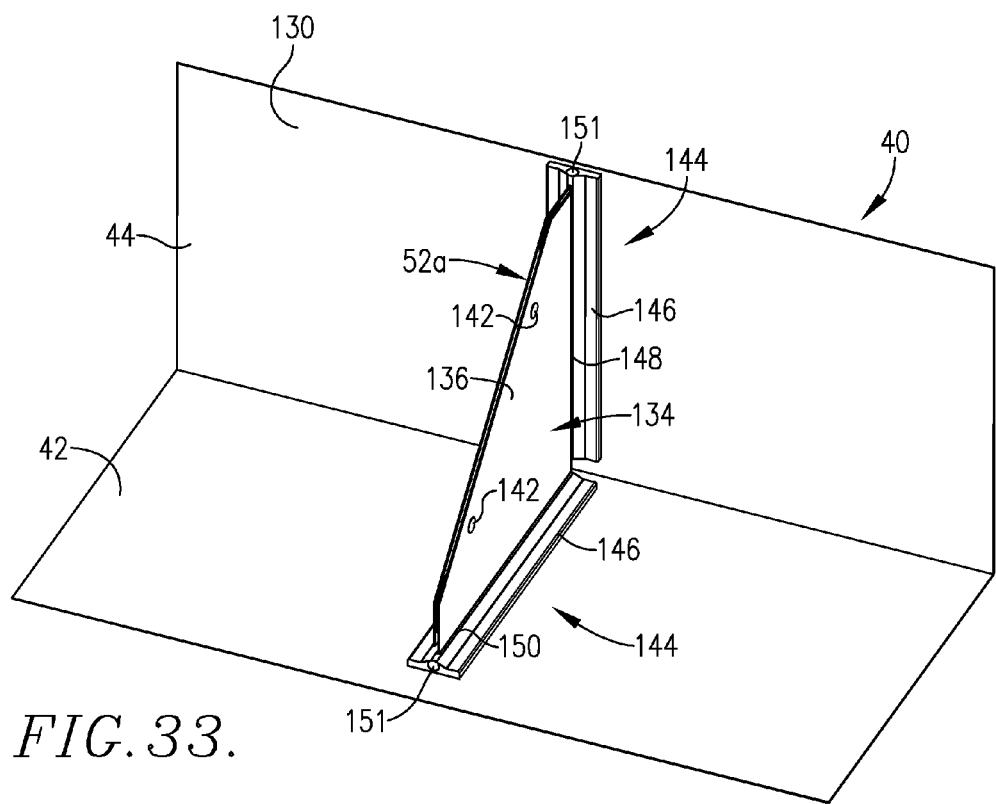

COLLAPSIBLE CONTAINMENT BERM

BACKGROUND OF THE INVENTION

1. Field of the Invention

The present invention is broadly concerned with mobile containment berms which can be quickly erected in the field for the containment of hazardous liquids or solids. More particularly, the invention is concerned with such berms which include a floor and an interconnected, upright sidewall cooperatively defining a containment zone, together with support structure for maintaining the sidewall in its upright position. The support structure is preferably in the form of a plurality of support leg assemblies secured to the outer and/or inner surface of the berm sidewall and pivotal about respective upright axes to permit quick, easy deployment of the support leg assemblies by pivoting thereof from a retracted position adjacent the sidewall to an extended, deployed position. When deployed, the support leg assemblies prevent collapse of the berm sidewall under the influence of the weight of hazardous material within the containment zone.

2. Description of the Prior Art

During field loading and off-loading of petrochemicals, fuels, or other environmentally hazardous liquids or solids, it is a common practice to provide containment berms which collect and retain any spills of the hazardous materials, thereby avoiding environmental contamination. Generally, these berms are foldable units which can be erected around the site of potential spills. For example, if a truck carrying a hazardous liquid is to be off-loaded in the field, the berm floor is placed on the ground and the truck is driven onto the floor. The berm sidewall is then erected around the truck and reinforcements are provided to prevent sidewall collapse under the influence of the weight of any hazardous material which is collected.

U.S. Pat. No. 5,762,233 describes such a portable berm. In the '233 berm design, the sidewall reinforcements require a vertical rigid leg carried by the sidewall, a generally horizontal leg extending parallel to the berm floor, and an inclined rigid leg extended between an upper portion of the sidewall and a horizontal leg. The requirement of three legs renders the erection process time consuming and labor-intensive. For example, there is no means of simultaneously deploying a plurality of spaced apart reinforcements; rather, each individual reinforcement must be individually assembled.

U.S. Pat. Nos. 5,090,588, 5,316,175, 5,547,312, and 5,511,683 describe other types of portable containment units.

SUMMARY OF THE INVENTION

The present invention overcomes the problems outlined above, and provides improved containment berms which are foldable and can be quickly erected in the field. Generally speaking, the berms of the invention include a floor, an upright, foldable sidewall connected to the floor to cooperatively present an interior containment zone for holding hazardous material. The berms also include support structure operably coupled with the sidewall and including a plurality of support leg assemblies secured to the sidewall and being pivotal about respective upright axes proximal to the sidewall. The support leg assemblies are pivotal from a retracted position close to the sidewall to a deployed position extending from the sidewall. The support leg assemblies in the deployed position thereof operable to prevent collapse of the sidewall under the influence of the weight of the hazardous material within the containment zone.

The preferred support leg assemblies each have a rigid member with an upright section proximal to the berm sidewall and a lower section extending from the sidewall when the leg assemblies are deployed. The rigid members are advantageously generally L-shaped in configuration and are encased within a non-load-bearing, flexible sheath. Pivoting movement of the support leg assemblies can be effected by a flexible strip of the sheath secured to the berm sidewall, or through the use of pivotal rail and pin assemblies.

In further preferred forms, retaining structure is provided for the leg assemblies in order to maintain the latter in the deployed position thereof during use of the berms. The retaining structure can take many forms, and desirably is operable to prevent pivoting of the associated leg assemblies in any direction from the deployed position thereof.

The leg assemblies of the invention can also be deployed as a group, i.e., a plurality of spaced apart leg assemblies can be simultaneously deployed without the need for individually manipulating the assemblies. To this end, it is preferred to attach a common pull strap to a plurality of the leg assemblies, such that axial pulling on the strap serves to simultaneously deploy the plural leg assemblies. This is possible in the present design owing to the fact that there are no separate leg segments which must be individually positioned.

BRIEF DESCRIPTION OF THE DRAWINGS

FIG. 3 is an elevational view of a support leg assembly forming a part of a wall support structure;

FIG. 4 is a sectional view taken along the line 4-4 of FIG. 3, and illustrating the internal construction of the support leg assembly;

FIG. 5 is a perspective view of a support leg assembly similar to that of FIGS. 3 and 4, but including a pair of snap members;

FIG. 6 is a perspective view of a flexible support member adapted to mate with the support leg assembly of FIG. 5, including a pair of complemental snap members;

FIG. 14 is a perspective view of another type of support leg assembly, in its retracted, non-deployed position;

FIG. 15 is a perspective view of the support leg assembly of FIG. 14, during deployment thereof;

FIG. 16 is a perspective view of the support leg assembly of FIG. 14, during the next step of deployment;

FIG. 17 is a perspective view of the support leg assembly of FIG. 14, during the final step of deployment;

FIG. 18 is a perspective view of the support leg assembly of FIG. 14, as fully deployed;

FIG. 19 is a perspective view of another type of support leg assembly, in its retracted, non-deployed position;

FIG. 20 is a perspective view of the support leg assembly of FIG. 19, during deployment thereof;

FIG. 21 is a perspective view of the support leg assembly of FIG. 19, during the next step of deployment;

FIG. 22 is a perspective view of the support leg assembly of FIG. 19, during the final step of deployment;

FIG. 23 is a perspective view of the support leg assembly of FIG. 19, as fully deployed;

FIG. 24 is a perspective view of another support leg assembly in its retracted, non-deployed position;

FIG. 25 is a perspective view of the support leg assembly of FIG. 24, during deployment thereof;

FIG. 26 is a perspective view of the support leg assembly of FIG. 24, in its fully deployed position;

FIG. 29 is a perspective view of an outside support leg assembly, making use of a rail and pin Keder connection;

FIG. 30 is a perspective view of an inside support leg assembly, making use of a rail and pin Keder connection;

FIG. 31 is a perspective view of the outside support leg assembly of FIG. 29, shown in its fully deployed position;

FIG. 32 is a perspective view of an inside support leg assembly making use of rail and pin Keder connections, prior to deployment of the assembly;

FIG. 33 is a perspective view similar to that of FIG. 32, but illustrating the inside support leg assembly in its fully deployed position;

DETAILED DESCRIPTION OF THE PREFERRED EMBODIMENT

Figure 1:
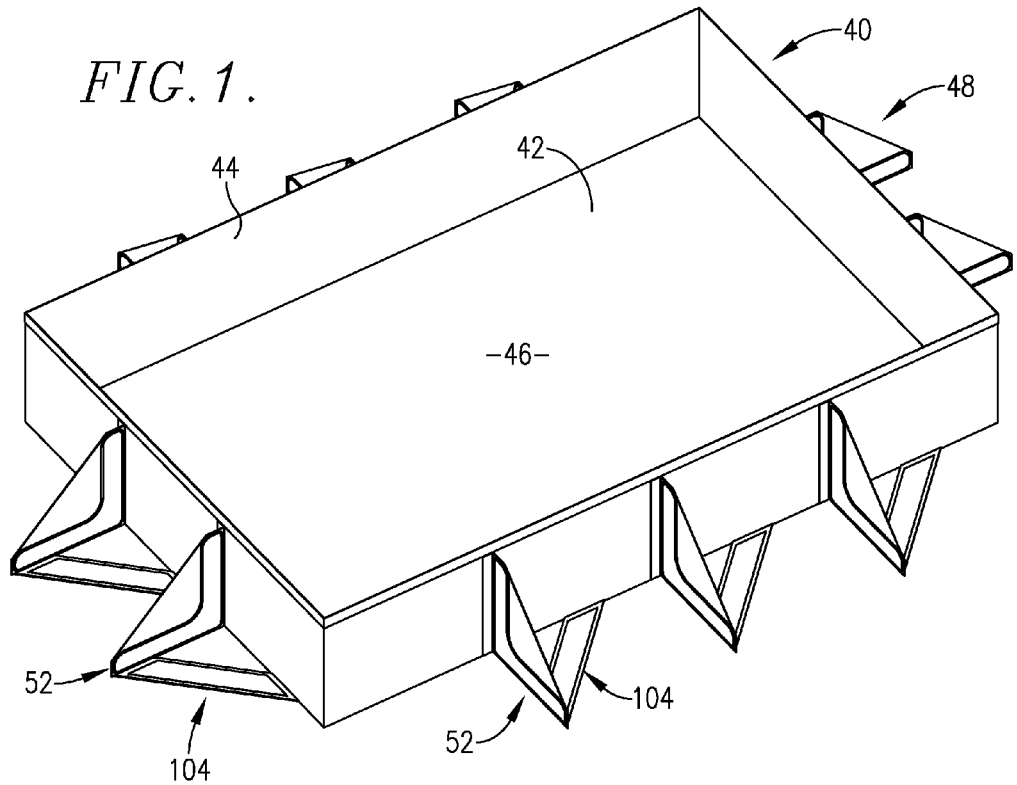
FIG. 1 is a perspective view of a containment berm in accordance with the invention, having outside wall support structure.
Figure 2:
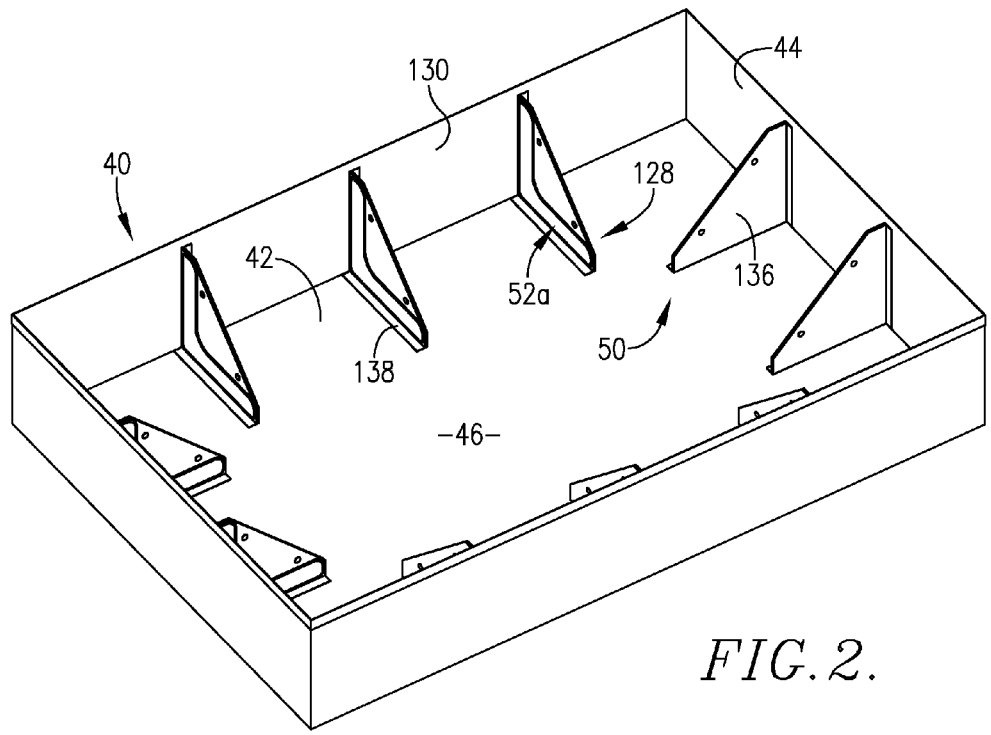
FIG. 2 is a perspective view of a containment berm in accordance with the invention, having inside wall support structure.
Figure 7:
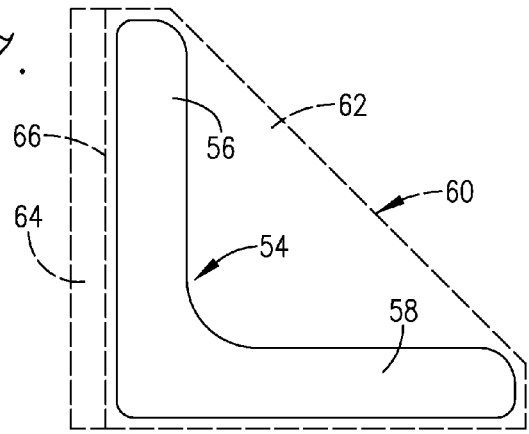
FIG. 7 is an elevational view of the rigid, internal support component of the support leg assembly of FIG. 3, with the flexible encasement material about the support component shown in phantom.

As noted above, the containment berms 40 in accordance with the invention broadly include a floor 42 with an interconnected, upstanding, continuous, foldable sidewall 44. The floor 42 and sidewall 44 cooperatively present an internal zone 46 for receiving and holding a hazardous material. The sidewall 44 may be supported by external support structure 48 (FIG. 1), and/or by internal support structure 50 (FIG. 2). Preferably, the floor 42 and sidewall 44 are welded or otherwise integrally attached so that the zone 46 is liquid-tight; alternately, a unitary sheet of material may be used for both the floor 42 and sidewall 44, thus eliminating any joints between the floor and sidewall. The floor 42 and sidewall 44 are advantageously formed of flexible, synthetic resin material, e.g., a PVC material having a thickness of from about 15-75 mils, more preferably from about 20-50 mils. If desired, the floor 42 may be formed of a thicker material as compared with the sidewall 44. The preferred berms 40 are completely portable, foldable, and may be easily erected in the field. At the same time, the berms 40 are capable of holding large quantities of liquid or solid hazardous material in a safe, ecologically friendly manner.

Embodiment of FIGS. 3, 4, 7, 11-13, and 34-35

In this embodiment, the support structure 48 is provided by means of a plurality of support leg assemblies 52, which are spaced apart about the perimeter of sidewall 44. Each such assembly 52 includes a rigid internal member 54 of generally L-shaped configuration and formed of rigid metal (e.g., aluminum) or synthetic resin material. As shown, the member 54 presents an upright section 56 and a lower section 58. Each assembly 52 also has a sheath 60 which encases the rigid member 54, as best seen in FIG. 4. The sheath 60 has a central segment 62 which extends from the top of upright section 56 to the outermost extent of lower section 58. Of course, this segment 62 is not load-bearing, and does not contribute the support of sidewall 44. The sheath 60 further includes an upright, flexible strip 64 extending along the length of the upright section 56. This strip 64, owing to its flexible nature, defines a pivot axis 66 for the corresponding leg assembly 52. In use, each of the strips 64 is welded or otherwise permanently affixed to the exterior surface 68 of sidewall 44, so that the respective support leg assemblies 52 may be pivoted from a retracted position close to surface 68, to a deployed position outwardly from the surface 68. Preferably, in the deployed position, the assemblies 52 are substantially perpendicular relative to sidewall 44.

In an alternative embodiment, the support leg assemblies 52 may be formed of an extruded, rigid synthetic resin material wherein a connection strip similar to the strip 64 is co-extruded with the main body of the leg assemblies.

Figure 11:
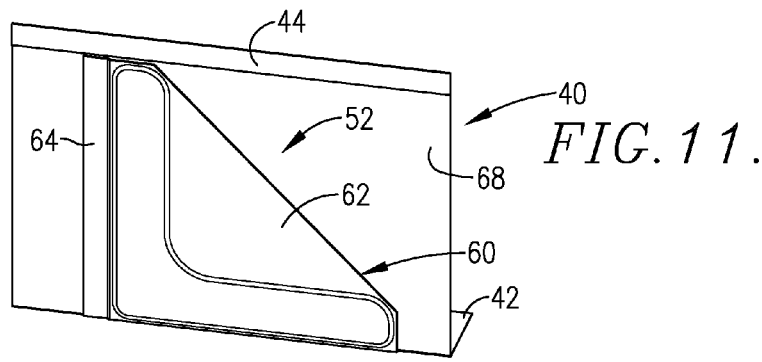
FIG. 11 is a perspective view illustrating the orientation of one of the support leg assemblies, as illustrated in FIG. 3, prior to deployment thereof.
Figure 12:
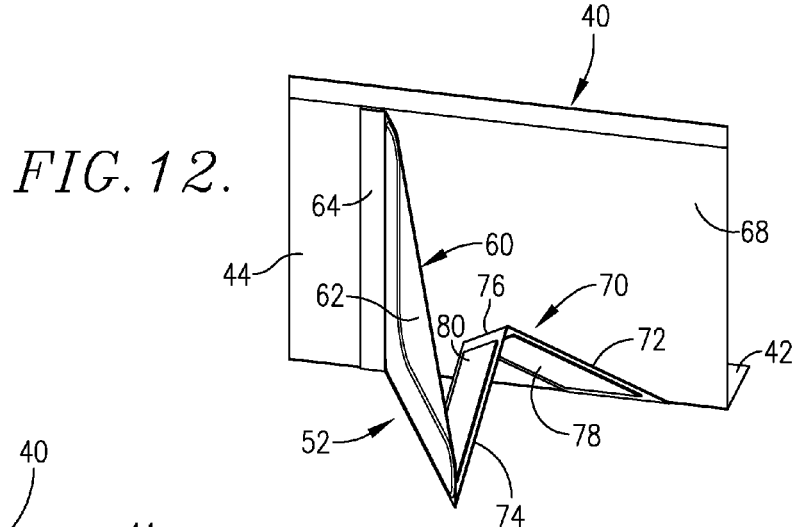
FIG. 12 is a perspective view similar to that of FIG. 11, but illustrating the support leg assembly during deployment.
Figure 13:
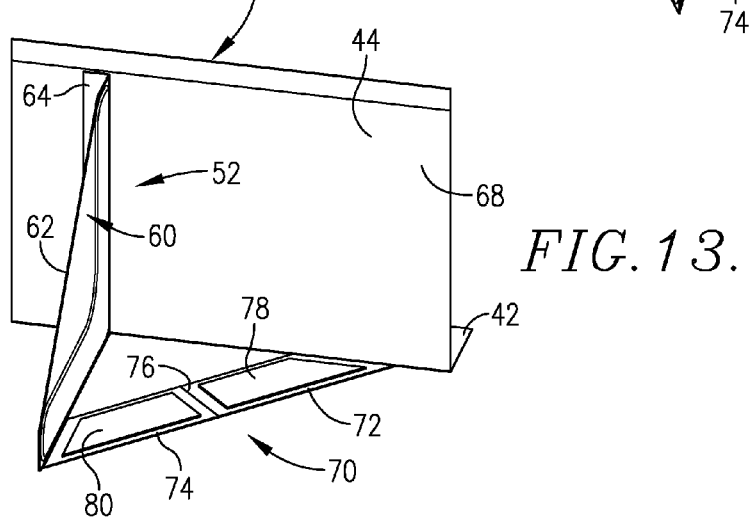
FIG. 13 is a perspective view similar to that of FIG. 12, but illustrating the support leg assembly fully deployed.

In many instances, it is desirable to provide the assemblies 52 with retaining structure to prevent inadvertent pivoting of the assemblies from their deployed positions, which could lead to failure of berm 40. Referring to FIGS. 11-13, a strap 70 is secured to the outer end of the assembly 52, and to the floor 42 or sidewall 44. The strap 70 has a pair of sections 72 and 74 with an intermediate fold line 76. Each of the sections 72, 74 has an internal weight 78 and 80. Consequently, as the associated support leg assembly 52 is pivoted toward the outwardly extending, deployed position, the strap 70 moves downwardly under the influence of gravity to assist in the deployment. At the same time, the fully deployed strap 70 (FIG. 13) prevents inadvertent pivoting movement of the leg assembly 52 beyond the fully deployed position. If desired, a coil or leaf spring (not shown) may be employed with or in lieu of the internal weights 78 and 80, to further facilitate deployment of the straps 70. This same spring feature may also be used with the other types of deployable retaining structures described below.

Figure 34:
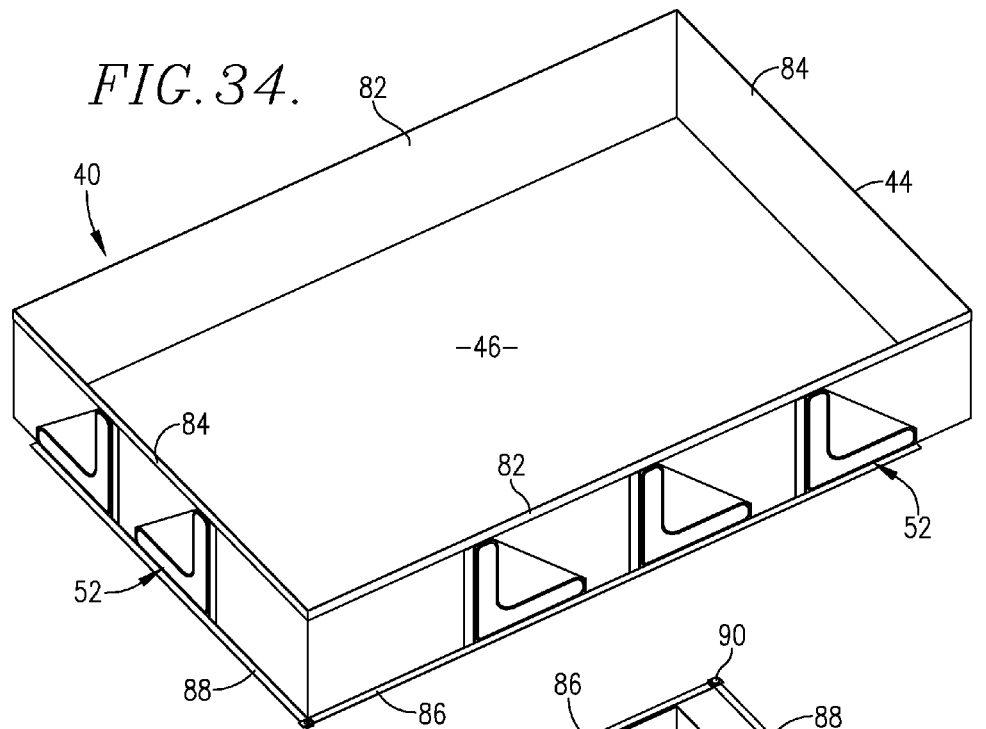
FIG. 34 is a perspective view of a containment berm in accordance with the invention, shown prior to the deployment of the support leg assemblies.
Figure 35:
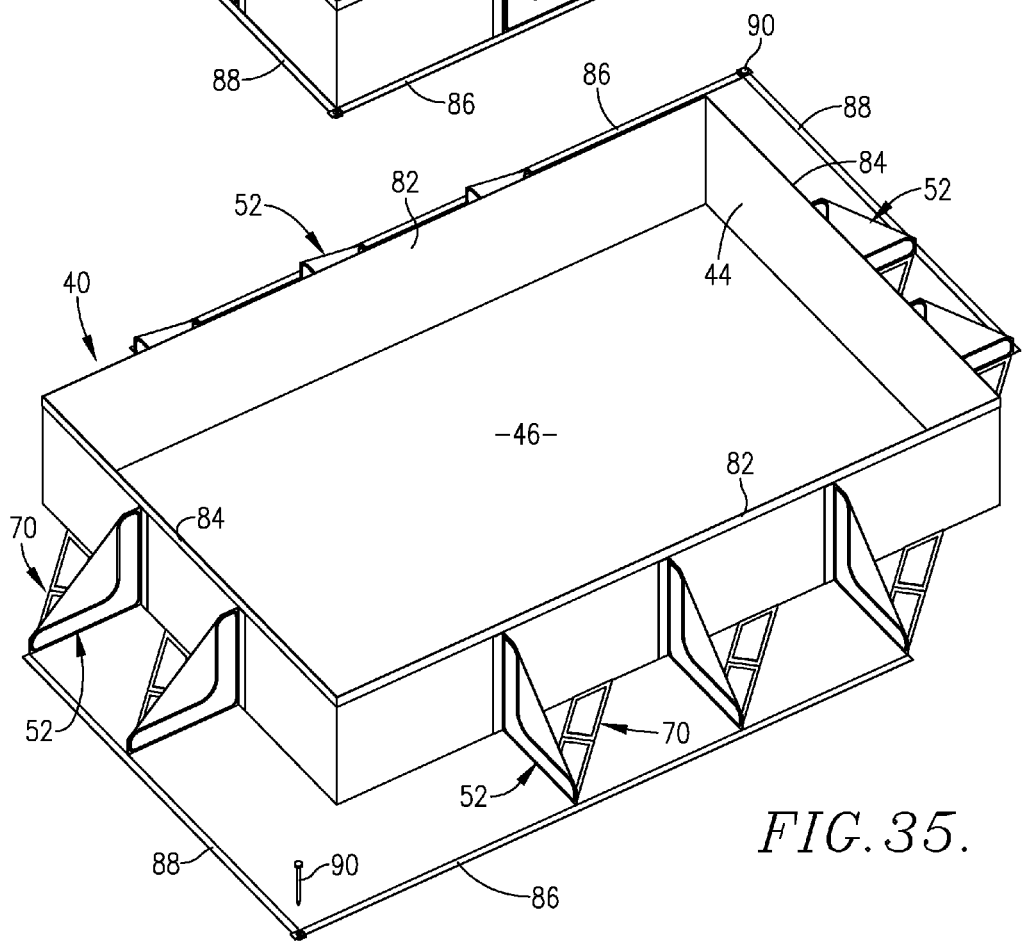
FIG. 35 is a view similar to that of FIG. 34, but illustrating a method of support leg assembly deployment making use of pull straps respectively connected to a plurality of support leg assemblies.

In particularly preferred forms, the berms 40 are of quadrate configuration (e.g., square or rectangular); an exemplary rectangular design presents a pair of long sidewall segments 82 and short sidewall segments 84 (FIGS. 34-35). In this design, it is further preferred to interconnect the support leg assemblies 52 secured to the sidewall segments 82, 84 with respective first and second pull straps 86 and 88. In this fashion, the berm 40 may be rapidly and easily erected. Specifically, the straps 86 and 88 are each grasped and pulled in an axial direction. This causes the assemblies 52 attached to each of the pull straps to simultaneously pivot about their corresponding upright pivot axes 66 (FIG. 3), to thereby move from the retracted position (FIG. 34) to the fully deployed position (FIG. 35). Thereupon, it is preferred to interconnect the ends of the orthogonal pull straps 86, 88 using connectors 90.

Embodiment of FIGS. 1 and 14-18

In this embodiment, the previously-described leg assemblies 52 are employed. However, in this instance, a different type of retaining structure is utilized. In particular, each leg assembly 52 has a strap 92 interconnected between the outer end of the assembly and to the floor 42 or sidewall 44. The strap 92 is similar to strap 70, in that it presents a pair of sections 94, 96 with an intermediate fold line 98. As depicted in FIGS. 14-18, the strap sections 94, 96 have internal weights 100, 102, just as in the case of strap 70. However, in this embodiment, the straps need not carry the internal weights. The retaining structure of this embodiment includes a secondary strap 104, which is pivotally secured to the outer end of assembly 52. The strap 104 is formed with an internal member (not shown) formed of rigid material, such as metal or synthetic resin, with an outer synthetic resin sheathing 106. In its retracted position, the strap 104 extends obliquely along the length of central segment 62 of sheath 60 (FIG. 16). Upon full deployment of the associated leg assembly 52, the secondary strap 104 is pivoted downwardly (FIG. 17) until it fully overlies the strap 92. Use of the secondary strap 104, together with the strap 92, prevents inadvertent pivoting movement of the associated leg assembly 52 in either direction. Thus, the strap 92 prevents movement of assembly 52 in a lefthand direction, whereas strap 104 prevents movement in a righthand direction, as viewed in FIG. 18.

Embodiment of FIGS. 19-23

As in the case of the previous embodiment, this embodiment utilizes the leg assemblies 52 secured to the outer surface of berm sidewall 44. The principal difference between this embodiment and that of FIGS. 1 and 14-18 resides in the use of locking members having the same shape as that of the assemblies 52. In particular, a segmented, non-weight-bearing strap 108 is connected between the outboard end of each assembly 52 and the adjacent sidewall 44. In this instance, the strap 108 has an upstanding tab 110, which is affixed by welding or other attachment to the bottom margin of sidewall 44. In alternate forms, the tab 110 may be secured to the underside of floor 42, or the tab may be L-shaped and attached to both the sidewall 44 and the underside of floor 42. The overall retaining structure further includes a substantially triangular retaining member 112, which is pivotally secured to the bottom margin of the assembly 52. The retaining member 112 has an internal solid section (not shown) and is covered by synthetic resin sheathing 114.

During deployment of the assemblies 52, the members are pivoted about their respective upright pivot axis 66, thereby extending the strap 108 (FIGS. 20-21). The retaining member 112 is maintained in an upright position in close adjacency to assembly 52, as best seen in FIG. 21. When the strap 108 is fully extended, the retaining member 112 is pivoted downwardly, as shown in FIG. 22, until it is fully seated over the strap 108 and is in close adjacency or abutting relationship with the lower margin of sidewall 44 (FIG. 23). It will be appreciated that this retaining structure prevents pivoting movement of the associated leg assembly 52 in either direction. Moreover, owing to the presence of the tab 110, the member 112 cannot slide under the floor 42. This provides an additional measure of safety against inadvertent pivoting of the assembly 52.

Figure 24A:
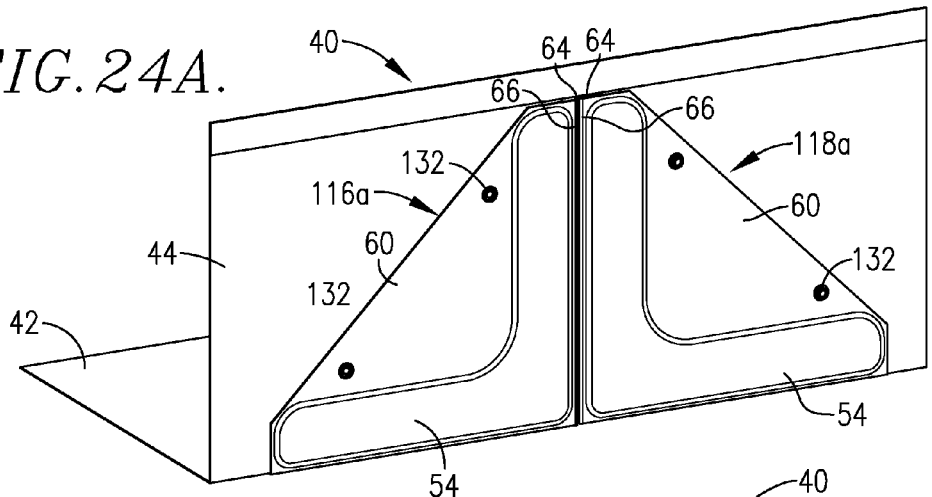
FIG. 24A is a perspective view similar to that of FIG. 24, but illustrating another support assembly embodiment.
Figure 25A:
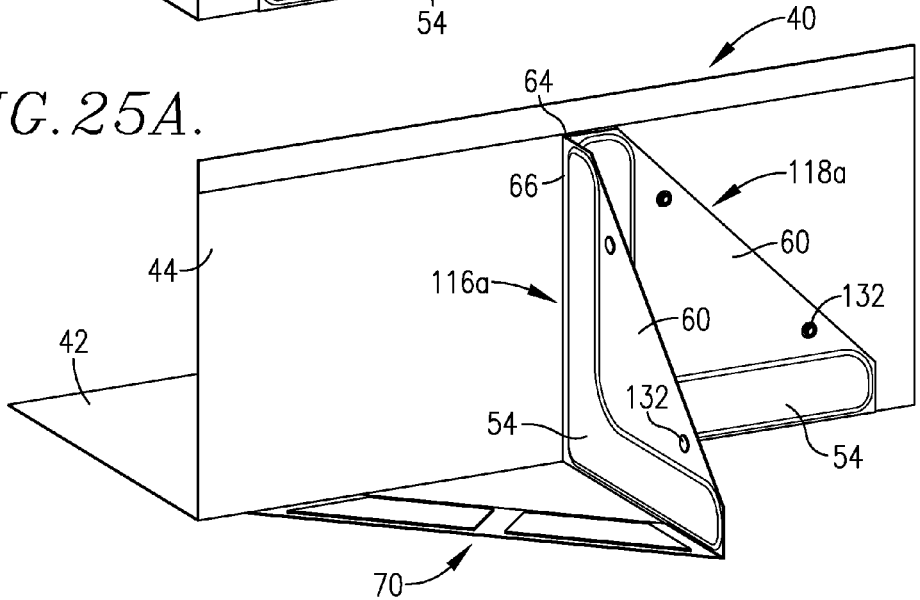
FIG. 25A is a perspective view of the support assembly of FIG. 24A, during deployment thereof.

Embodiment of FIGS. 24-26

This embodiment depicts another type of retaining structure used with the leg assemblies 52. Specifically, a pair of retainer members 116 and 118 are located on either side of each assembly 52, as best seen in FIG. 25. Each of the retainer members includes a generally triangular segment 120 or 122, which is sized to mate with the leg assembly 52. The segments 120, 122 have an internal rigid member with an outer sheath 124, 126 of synthetic resin material. The segments 120, 122 are moreover pivotal about respective upright axes adjacent the corresponding pivot axis 66 of the assembly 52. This can be accomplished by securing a section of the sheathing to the sidewall 44 or to the sheath 60 of the assembly 52. In addition, each of the segments 120, 122 is equipped with a weighted strap 70, previously described with reference to the first embodiment.

In use, each assembly 52 is pivoted to its deployed position (FIG. 25), whereupon the members 116, 118 are pivoted until they come into close adjacency with the assembly 52. As this occurs, the corresponding straps 70 are likewise deployed. Thus, the assembly 52 is tightly sandwiched between the retainer members 116, 118, thereby preventing inadvertent pivoting movement of the assembly 52.

Embodiment of FIGS. 24A-26A

This embodiment is very similar to that of FIGS. 24-26, but excludes the use of the central support leg assembly 52. That is, a pair of generally triangularly shaped retainer members 116a and 118a are provided, each secured to the sidewall 44 in close, substantially abutting relationship to each other. The retainer members 116a, 118a have respective internal, rigid, generally L-shaped members 54 encased within a sheath 60 of flexible synthetic resin material. Each sheath 60 includes an upright, flexible strip 64 secured to sidewall 44 and defining a pivot axis 66 for the corresponding members 116a or 118a. The sheaths 60 also have mating snap components 132. Additionally, each of the members 116a, 118a is equipped with a weighted strap 70, previously described.

Figure 26A:
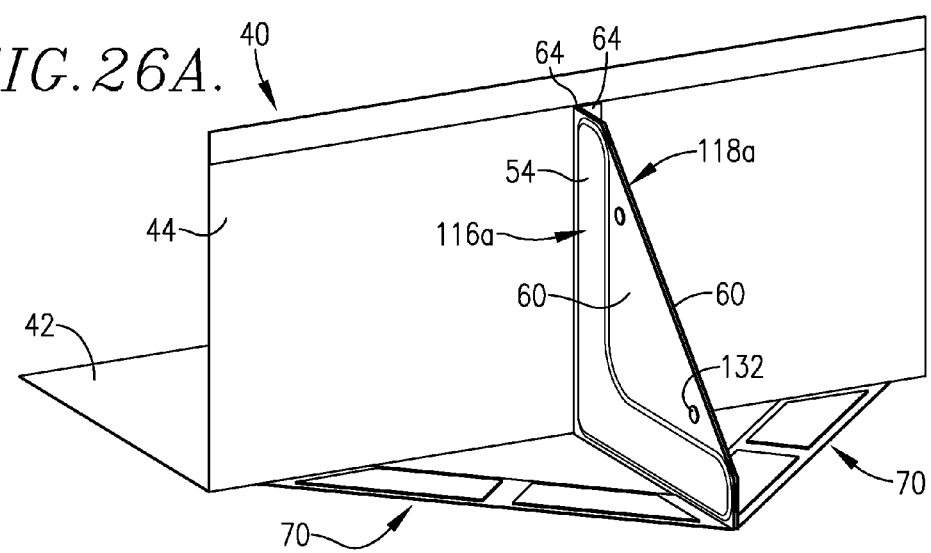
FIG. 26A is a perspective view of the support assembly of FIG. 24A, in its fully deployed position.

In use, the individual members 116a, 118a are pivoted about their respective axes 66 until the members come into face-to-face engagement. Thereupon, the snap components 132 are attached so as to secure the members 116a, 118a together. As illustrated in FIG. 26a, in the final deployed position, the straps 70 prevent pivotal movement of the interconnected members 116a, 118a.

Embodiment of FIGS. 2, 5-6, and 27-28

Figure 27:
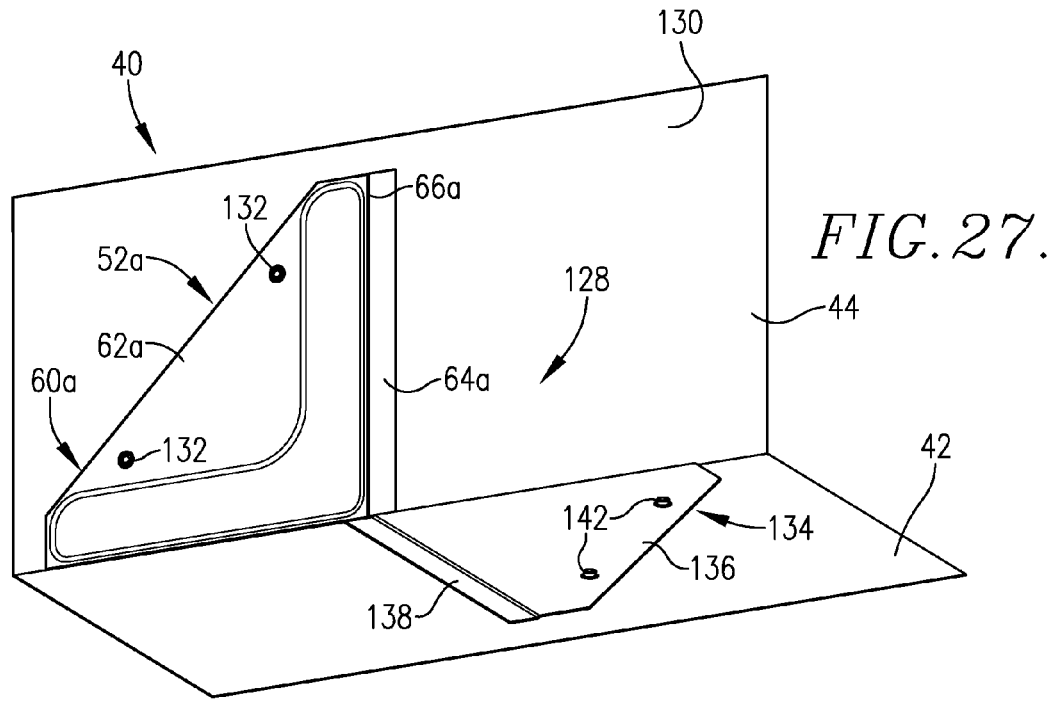
FIG. 27 is a perspective view of an inside support leg assembly in its retracted, non-deployed position.
Figure 28:
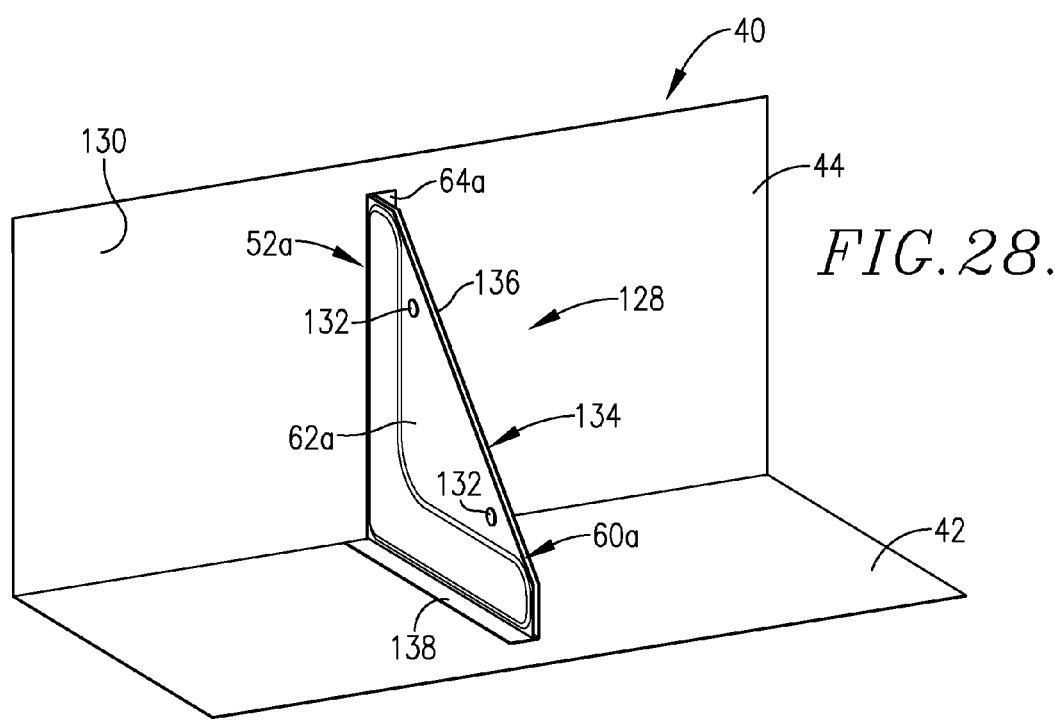
FIG. 28 is a perspective view of the inside support leg assembly of FIG. 27, in its fully deployed position.

This embodiment relates to a berm 40 having internal support structure 50 (FIG. 2). The support structure 50 includes a plurality of internal support leg assemblies 128 operatively connected to the floor 42 and the internal surface 130 of wall 44. Referring to FIGS. 27-28, it will be seen that each support leg assembly 128 includes a modified support leg assembly 52a, which differs from the assembly 52 by provision of a pair of spaced apart snap components 132 provided in the central segment 62a. That is, the assembly 52a includes a generally L-shaped, substantially rigid internal metallic or synthetic resin support 54a presenting an upright section 56a proximal to sidewall 44 and a lower leg section 58a. A sheath 60a encases the member 54a, and includes the section 62a as well as a flexible strip 64a welded or otherwise secured to surface 130 of wall 44 and defining an upright pivot axis 66a (FIG. 5). As in the case of the assemblies 52, each of the modified assemblies 52a is designed to pivot about the corresponding axis 66a from a retracted position close to surface 130 (FIG. 27) to a deployed position substantially perpendicular with sidewall 44.

In order to properly maintain the assembly 128 in its deployed position, a retainer 134 is provided (FIG. 6). The retainer 134 is a generally triangular, flexible member 136 with or without an internal member 54a and having a flexible attachment strip 138 welded or otherwise secured to floor 42. The strip 138 defines a generally horizontal pivot axis 140 in substantial alignment with upright pivot axis 66a. The member 136 is also equipped with a pair of snap components 142 which are designed to mate with snap components 132 of leg assembly 52a.

In use, each assembly 52a is first pivoted outwardly about axis 66a to its deployed position, where the bottom edge of the assembly 52a is closely adjacent to the corresponding pivot axis 140. Thereupon, the member 136 is pivoted upwardly about axis 140 to come into face-to-face engagement with the assembly 52a. At this point, the snap components 132, 142 are inter-engaged, thereby completing the assembly. It will be readily understood that the assembly 52a is prevented from inadvertent pivoting movement owing to the interconnection between the assembly 52a and member 136.

Embodiment of FIGS. 29-33

FIGS. 29-33 illustrate alternate designs making use of "Keder" rail and pin pivot assemblies 144 in lieu of the previously described flexible strips. Such rail and pin assemblies are conventional and well known in the art, and comprise an elongated rail 146 presenting a circular in cross-section, open slot 148. An elongated pivot pin 150 is received within the open slot 148 to provide a pivoting mechanism (FIGS. 29-30). A stop plug 151 is also provided to maintain the integrity of each assembly 144. For increased structural integrity, a pair of plugs 151 may be positioned adjacent each end of pivot pin 150. Further, the plug(s) 151 may be threaded into the slot 148, if needed.

FIG. 31 illustrates the use of a rail and pin assembly in the context of an external support leg assembly 52. The pin 150 is secured within the flexible strip 64, and the pin 150 defines the upright pivot axis for the leg assembly. As also illustrated, a weighted strap 70 is used to prevent further inadvertent pivoting of the assembly 52.

FIGS. 32-33 depict the use of the rail and pin assemblies 144 in the context of internal support leg assemblies 52a. As seen, one rail 146 is secured to surface 130 of sidewall 44, whereas another rail 146 is secured to floor 42. The pins 150 are respectively connected to the assembly 52a and retainer member 136, instead of the connection strips.

In use, the assembly 52a is first pivoted outwardly from its retracted position to its deployed position closely adjacent to slot 148 of the lower assembly 144. Then, the member 136 is pivoted upwardly and the snap components 132, 142 are engaged to complete the assembly.

It will be appreciated that the use of the rail and pivot pin assemblies 144 allows field replacement of some or all of the support leg assemblies 52a. It is also desirable to design the weighted straps 70 and other components of the assemblies 52a to be field replaceable. Finally, the rail and pivot pin assemblies any be used in any of the embodiments of the invention.

Figure 8:
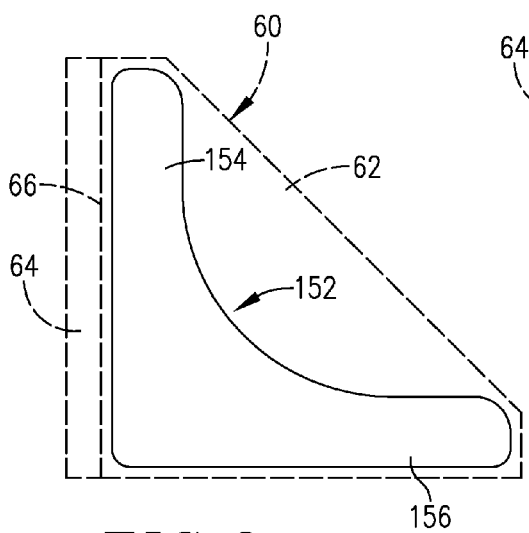
FIG. 8 is an elevational view similar to that of FIG. 7, but depicting another type of support component.
Figure 9:
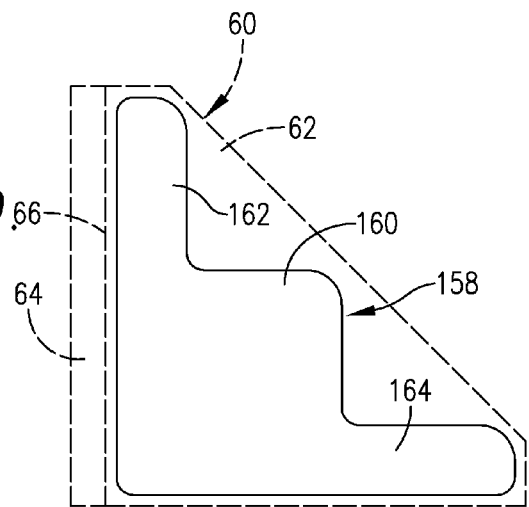
FIG. 9 is an elevational view similar to that of FIG. 7, but depicting a still further type of support component.
Figure 10:
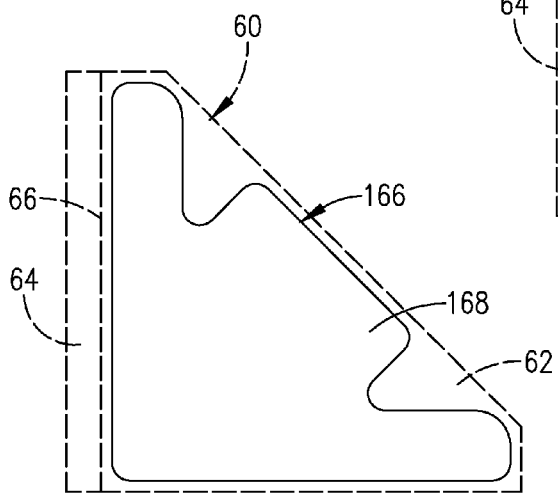
FIG. 10 is an elevational view similar to that of FIG. 7, but depicting another type of support component.

Embodiments of FIGS. 8-10

In the preceding discussion, the support leg assemblies have made use of an internal, generally L-shaped rigid member 54 or 54a. While such a design is preferred, the invention is by no means limited in this respect. FIGS. 8-10 provide further exemplary designs where in differently shaped rigid members are provided. As shown, in all instances, the overall leg assemblies include an outer sheath 60 with a central segment 62 and a flexible attachment strip 64 presenting a pivot axis 66. FIG. 8 illustrates a modified L-shaped member 152 which includes upright leg 154 and lower leg 156. However, the radius of curvature at the juncture between the legs is substantially greater than that of the members 54, 54a. FIG. 9 depicts a member 158 having a central, outwardly extending protrusion 160 between the upright and lower legs 162, 164. The member 166 of FIG. 10 is similar to member 158 of FIG. 9, but has a differently shaped, more massive central protrusion 168.

Of course, other types of support members could readily be designed (e.g., a full triangle member), so long as the design provides adequate support for maintaining sidewall 44 in its upright position to thereby assure the integrity of the berm 40. It will also be appreciated that the features of the various individual embodiments, such as the retainer structures, can be used in any of the respective embodiments. Additionally, a given berm could be provided with both internal and external support leg assemblies if desired.

We claim:
1. A containment berm, comprising:
a generally horizontally extending floor;
an upright, foldable sidewall connected to said floor to cooperatively present an interior containment zone for holding hazardous material;
support structure operably coupled with said sidewall and including a plurality of support leg assemblies secured to said sidewall and being pivotal about respective upright axes proximal to the sidewall, each of said upright axes extending upwardly relative to said floor, said support leg assemblies each having an elongated lower margin and pivotal from a retracted position close to said sidewall to a deployed position extending from said sidewall, said support leg assemblies in the deployed position thereof operable to prevent collapse of said sidewall under the influence of the weight of said hazardous material within the containment zone; and
retaining structure associated with each of said leg assemblies and operable to maintain the leg assemblies in said deployed position,
each retaining structure comprising an elongated first strap secured to said floor or sidewall at a position laterally spaced from the upright axis of the associated support structure, and to said support leg assembly at a point spaced from said sidewall when the support leg assembly is deployed, such that the longitudinal axis of said first strap is obliquely oriented relative to the elongated lower margin of the associated leg assembly when deployed.

2. The containment berm of claim 1, said support leg assemblies each including a rigid member having an upright section proximal to said sidewall and a lower section extending from said sidewall in said deployed position.

3. The containment berm of claim 2, said rigid member formed of metal or synthetic resin and being generally L-shaped.

4. The containment berm of claim 2, said rigid member being encased within a non-load-bearing, flexible sheath.

5. The containment berm of claim 1, each of said support leg assemblies including a flexible strip of material secured to said sidewall, said flexible strips defining said upright axes and permitting said pivoting of said support leg assemblies.

6. The containment berm of claim 1, said first strap being flexible and having a pair of spaced apart weights oriented such that when said support leg assembly is pivoted about the adjacent upright axis, the first strap moves under the influence of gravity to assist in the deployment of the support leg assembly.

7. The containment berm of claim 6, including a second strap in overlying relationship to said first strap to prevent inadvertent pivoting movement of the support leg assembly from said deployed position.

8. The containment berm of claim 1, including a retaining member pivotally coupled to said support leg assembly in overlying relationship to said first strap, said retaining member operable to prevent inadvertent pivoting movement of the support leg assembly from said deployed position.

9. The containment berm of claim 1, said retaining structure further comprising first and second retaining elements each proximal to said support leg assembly and being pivotal about respective upright axes, said retaining elements extending from said sidewall and in close adjacency with the opposed sides of the support leg assembly when the support leg assembly is in said deployed position, said first strap secured to said first retaining element.

10. The containment berm of claim 9, there being a second retaining strap, said second strap secured to said floor or sidewall and said second retaining element.

11. The containment berm of claim 1, said support leg assemblies secured to said sidewall by means of rail and pin assemblies to permit said pivoting movement of the support leg assemblies.

12. The containment berm of claim 1, including a pull strap operably coupled with at least certain of said support leg assemblies in order to permit simultaneous pivoting movement of the support leg assemblies from said retracted position to said deployed position by pulling on the pull strap.

13. The containment berm of claim 12, said pull strap being secured to said support leg assemblies at the ends thereof remote from said sidewall when said support leg assemblies are in said deployed position.

14. The containment berm of claim 1, said floor and sidewall formed of flexible synthetic resin material.

15. The containment berm of claim 1, said zone being liquid tight to prevent escape of liquid hazardous material from the zone.

16. The containment berm of claim 1, each retaining structure further including a substantially triangular retaining element operably coupled to said support leg and overlying said first strap in said deployed position.

\* \* \* \* \*